(12) United States Patent
Chow et al.

(10) Patent No.: US 7,774,780 B2
(45) Date of Patent: Aug. 10, 2010

(54) SYSTEMS AND METHODS FOR AUTOMATIC RETRY OF TRANSACTIONS

(75) Inventors: Thorick Chow, El Cerrito, CA (US); Seth White, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1524 days.

(21) Appl. No.: 10/967,001

(22) Filed: Oct. 15, 2004

(65) Prior Publication Data
US 2005/0273655 A1   Dec. 8, 2005

Related U.S. Application Data

(60) Provisional application No. 60/573,218, filed on May 21, 2004.

(51) Int. Cl.
*G06F 9/46* (2006.01)
(52) U.S. Cl. .......................................... 718/101; 707/10
(58) Field of Classification Search ................. 718/101; 707/1–10, 200, 202; 705/64–75
See application file for complete search history.

(56) References Cited

U.S. PATENT DOCUMENTS

| | | | | |
|---|---|---|---|---|
| 6,101,527 | A * | 8/2000 | Lejeune et al. | 709/201 |
| 2003/0028682 | A1 * | 2/2003 | Sutherland | 709/315 |
| 2004/0015824 | A1 * | 1/2004 | Felkey et al. | 717/104 |
| 2006/0112011 | A1 * | 5/2006 | Al-Ali | 705/42 |

OTHER PUBLICATIONS

Barga et al, Recovery Guarantees for General Multi-Tier Applications, IEEE, 2002, pp. 1-12.*

Thirukonda et al, WebSpy: An Architecture for Monitoring Web Server Availability in a Multi-Platform Environment, Florida Institute of Technology, 2002, pp. 11-22.*

Frolund et al, Web e-Transactions, CSREA, Jun. 25-28, 2001, pp. 1-9.*

Barga et al, Persistent Applications via Automatic Recovery, IEEE, 2003, pp. 1-10.*

(Continued)

*Primary Examiner*—Diem K Cao
(74) *Attorney, Agent, or Firm*—Fliesler Meyer LLP

(57) ABSTRACT

The feature of automatic retry of container-managed transactions configures the container to allow automatic retries of container-managed transactions that have been rolled back due to exceptions thrown at runtime. More specifically, on a per method basis, the container can be instructed to retry a failed transaction as using a new one up to a specified number of times if that method was the originator of the transaction that has been rolled back. The enabling of automatic transaction retries is accomplished either at deployment time by setting properties in the deployment descriptor of an instance of a class, such as EJB, or at runtime by setting properties on the EJB via a console on the application server. The automatic retry of container-managed transactions is a convenient feature that may alleviate the client of the task of explicitly coding transaction retries. In addition to programming convenience, retrying transactions using this feature may also offer performance benefits. This description is not intended to be a complete description of, or limit the scope of, the invention. Other features, aspects, and objects of the invention can be obtained from a review of the specification, the figures, and the claims.

25 Claims, 5 Drawing Sheets

OTHER PUBLICATIONS

Kim, Middleware of Real-Time Object Based FAult-Tolerant Distributed Computing Systems: Issues and Some Approaches, Dearm Lab, UCI, 2001, pp. 3-8.*

Sybase, Inc., Chapter 25: Managing Persistent Component State, Sybase, Inc., 2002, pp. 1-18.*

Sybase, Inc., New features in version 4.1.3, Sybased, Inc., 2003, pp. 1-17.*

Purish et al, Oracle Application Server Containers for J2EE, Oracle, Sep. 2003, pp. 1-17.*

Monson-Haefel, Enterprise JavaBeans, $2^{nd}$ Edition Covers EJB 1.1, O'Reilly, 2000, pp. 364-389.*

* cited by examiner

```
<ejb-jar>
  <enterprise-beans>
    <session>
        <ejb-name> ProcureBean </ejb-name>          301
        <session-type> Stateless </session-type>        302
        <transaction-type> Container </transaction-type>   303
    ...
  </enterprise-beans>
  <assembly-descriptor>
      <container-transaction>
        <method>
           <ejb-name> ProcureBean </ejb-name>
           <method-intf> Remote </ method-intf>
           <method-name> procure </ method-name>        304
             <method-params>
                <method-param> int </ method-param>
                <method-param> float </ method-param>
             </method-params>
         </method>
         <trans-attribute> RequiresNew </trans-attribute>    305
      </ container-transaction>
    </ assembly-descriptor>
</ejb-jar>
```

Figure 3

```
<weblogic-ejb-jar>
  <weblogic-enterprise-bean>
    <ejb-name> ProcureBean </ ejb-name>
      ...
  </weblogic-enterprise-bean>
  <retry-method-on-rollback>                              401
    <description> Retry the procurement if we fail due to transaction rollback </description>
    <retry-count> 2 </retry-count>                        402
    <method>
      <ejb-name> ProcureBean </ejb-name>                  403
      <method-intf> Remote </ method-intf>
      <method-name> procure </ method-name>               404
      <method-params>
        <method-param> int </ method-param>
        <method-param> float </ method-param>
      </method-params>
    </method>
  </retry-method-on-rollback>
</weblogic-ejb-jar>
```

Figure 4

SYSTEMS AND METHODS FOR AUTOMATIC RETRY OF TRANSACTIONS

CLAIM OF PRIORITY

This application claims priority from the following applications, which are hereby incorporated by reference in their entireties:

U.S. Provisional Patent Application No. 60/573,218, entitled SYSTEMS AND METHODS FOR AUTOMATIC RETRY OF TRANSACTIONS by Thorick Chow et al., filed May. 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of transactions using EJB instances.

BACKGROUND

A container runs as part of an application server to provide enterprise applications with a high level of abstraction using server-side application components that encapsulate the business logic of the applications. Here server-side application components can be instances of a programmable class (also referred to as class), which can be but is not limited to, a JAVA® bean, an Enterprise JAVA® Bean (EJB), an interface, a module, and other suitable concepts, and EJB will be used to illustrate the various embodiments of the invention in the following context. Two important types of EJBs are: the entity bean, which is a component that represents an object-oriented view of some entities stored in a persistent storage, such as a database, and the session bean, which is a component in the container that represents some business logic running on the application server. A session bean can be either stateful or stateless.

BRIEF SUMMARY OF THE INVENTION

In accordance with various embodiments, the feature of automatic retry of container-managed transactions configures the container to allow automatic retries of container-managed transactions that have been rolled back due to exceptions thrown at runtime. More specifically, on a per method basis, the container can be instructed to retry a failed transaction as using a new one up to a specified number of times if that method was the originator of the transaction that has been rolled back. The enabling of automatic transaction retries is accomplished either at deployment time by setting properties in the deployment descriptor of an instance of a class, such as EJB, or at runtime by setting properties on the EJB via a console on the application server. The automatic retry of container-managed transactions is a convenient feature that may alleviate the client of the task of explicitly coding transaction retries. In addition to programming convenience, retrying transactions using this feature may also offer performance benefits.

An EJB container may initiate and manage one or more transactions, each of which is started by a method in an EJB instance in the container. Each transaction of the method allows a client to perform business logic and/or exchange information. A container-managed transaction allows the container to demarcate a transaction using declarative instructions specified in a deployment descriptor, which allows the editing of both the structural and application assembly information of the container. One benefit of such declarative container-managed transactions is that, under such model, the application designer and/or user does not need to explicitly begin or end any transactions in an application code. The transaction boundaries are determined dynamically before and after the invocation of an EJB method by the container.

Transactions that are started on behalf of an EJB method are expected to fail occasionally. For example, operating in highly concurrent environments may yield database deadlocks, or optimistic concurrency exceptions may occur if optimistic concurrency is in effect. Both of these conditions will result in transactions being rolled back due to commitment failure to an underlying persistent data store, such as the database. In these cases, it is standard programming practice to write application code to expect the failure and to retry the failed action. A typical programming pattern for accomplishing this can be, but is not limited to enclosing the EJB method within a try catch block, which checks to see if an exception such as TransactionRolledBackException has been thrown. Such programming practice however, may add extra burden on the developer and make the source code tedious. In addition, it may also cause performance degradation when the method is invoked remotely over a network, which can be an internet or intranet.

BRIEF DESCRIPTION OF THE DRAWINGS

FIG. 3 is an exemplary code illustrating an XML schema instance of a deployment descriptor in accordance with one embodiment of the present invention.

FIG. 4 is an exemplary code illustrating an XML schema instance of a deployment descriptor in accordance with one embodiment of the present invention.

DETAILED DESCRIPTION

Figure 1:
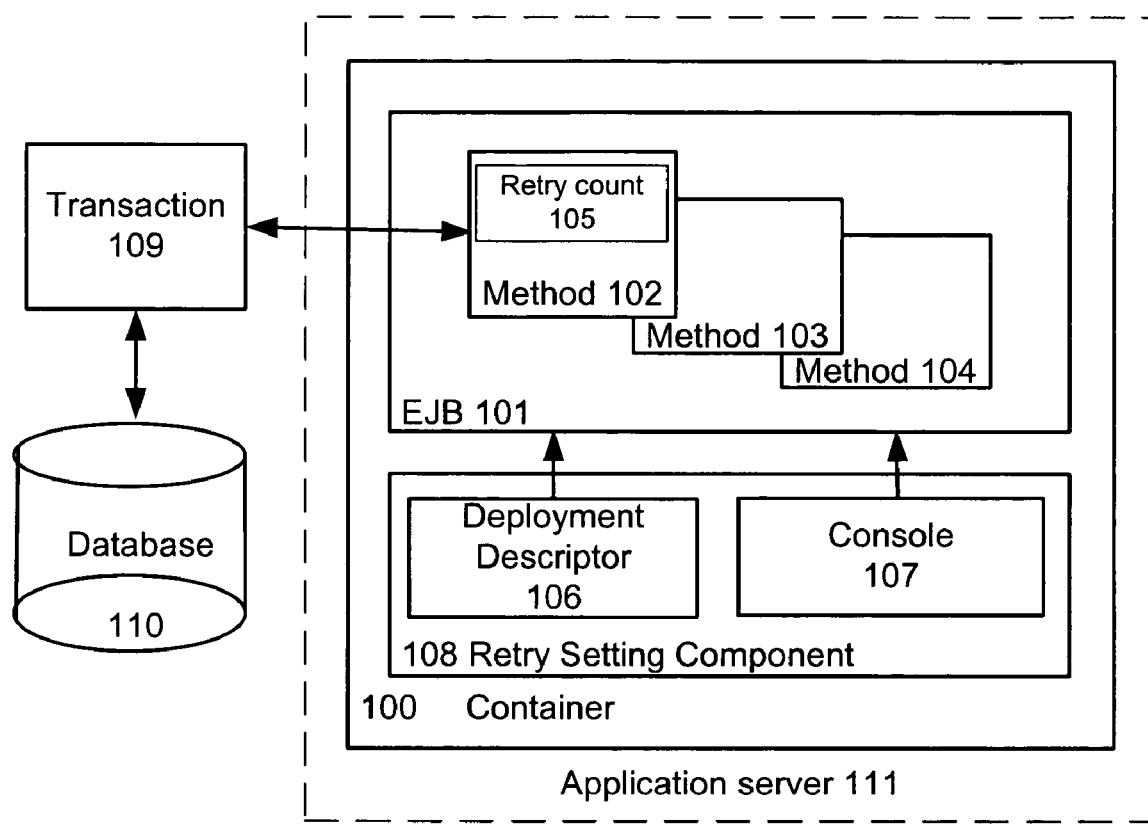
FIG. 1 is an illustration of a system for the automatic retry of container-managed transactions in accordance with one embodiment of the present invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods of the present invention provide the ability of automatic retry of container-managed transactions by configuring the EJB container so that it automatically retries container-managed transactions that have been rolled back. More specifically, on a per method basis, the container can be instructed to retry a failed transaction as using a new one up to a specified number of times if that method was the originator of the transaction that has been rolled back. The enabling of automatic transaction retries is accomplished either at deployment time by setting properties in the deployment descriptor of the EJB, or at runtime by setting properties on the EJB via a console on the application server, such as the WebLogic Server.

The automatic retry of container-managed transactions is a convenient feature that provides non-programmatic ways for enabling the retrying of failed transactions that are initiated by an EJB method. There are a number of significant advantages gained by this feature, including:

- It anticipates the occurrence of a potential rollback and automatically retries with a new transaction for the method that started the failed transaction, thus alleviating the client of the task of explicitly coding transaction retries.
- It provides flexibility to control the behavior of an application after its programming is completed. An application may be deployed in which a particular EJB method is used without any transaction retry code in the application. At runtime on a production system, it may be noticed that that method is experiencing optimistic concurrency failures. Using the console, transaction retries can be enabled while the application is in use without stopping or redeploying the application.
- It provides performance benefits for EJB methods accessed remotely over a network. When the EJB that is automatically retrying transactions is being accessed remotely, performance is improved by removing the need for network traffic that would otherwise be required to retry the failed transaction. The network traffic includes, but is not limited to, the serializing and sending of the exception as well as the messages required to re-invoke the method remotely. This savings comes from the fact that the automatic retrying of transactions happens locally in the same JAVA® Virtual Machine (JVM) in which the EJB is running.

The automatic retry of container-managed transactions is for use with session and entity beans that use container-managed transaction demarcation. Message driven beans are excluded because they already have this functionality. When using container-managed transaction demarcation, instances of message driven beans do not acknowledge the receipt of a message that they are processing when the transaction bracketing the receipt of the message is rolled back; thus the message will be retried in a new transaction. Timer Beans are also excluded because they already have this functionality.

FIG. 1 is an illustration of a system for the automatic retry of container-managed transactions in accordance with one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an EJB 101 inside a container 100 running on an application server 111 may have one or more methods 102, 103, 104 defined in it. Each method has a property of retry count 105 as well as other properties defined via a retry setting component 108, either statically by a deployment descriptor 106 in XML format at the deployment time of the EJB, or dynamically by a console 107 of the application server at run time. A method 102 of the EJB may be invoked, which starts a container-managed transaction 109 at runtime. The transaction may perform certain business logics and exchange data with an underlying database 110. If the transaction fails to commit, it will inform the initiating method by throwing an exception, and be rolled back. The EJB will then decide if another transaction of the same method will be retried depending upon the retry limit set by the deployment descriptor on the console.

Figure 2:
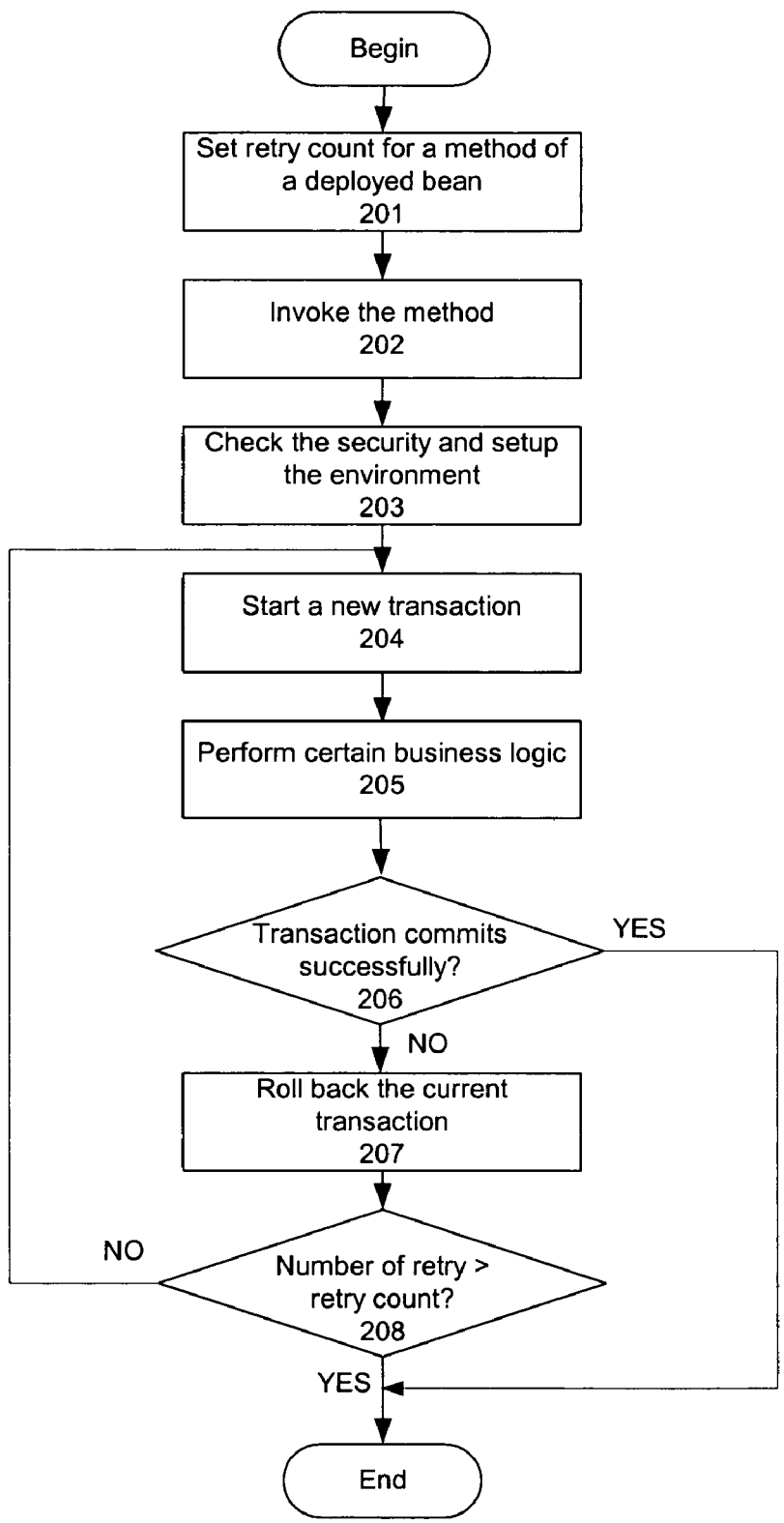
FIG. 2 is a flow chart illustrating an exemplary process of the automatic retry of container-managed transactions in accordance with one embodiment of the invention.

FIG. 2 is a flow chart illustrating an exemplary process of the automatic retry of container-managed transactions in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a retry count is set by either a deployment descriptor or a console at step 201 for each method that may initiate a business transaction. Once the method is invoked at step 202, the security will be checked and environment be set up at step 203. The method will then initiate a transaction at step 204, which will perform certain business logic at step 205. If the transaction fails to commit to the underlying database at step 206, it will inform the method with an exception and be rolled back at step 207. If the number of times the method has been retried does not exceed the specified retry count at step 208, a new transaction will be started at step 204 again. Notice that when the transaction is retried, the security does not have to be re-checked nor the environment have to be re-setup.

In some embodiments, a method invoked may have a container-managed transaction attribute such as "RequiresNew" or "Required" defined. The automatic retry of transactions will only occur for those methods on whose behalf the EJB container starts a transaction. For those methods that have a transaction attribute of "RequiresNew", the EJB container will always begin a new transaction when those methods are called and retry of transactions will occur if those methods are configured to retry transactions. On the other hand, for those methods that have a transaction attribute of "Required", the EJB container will only start a new transaction if the methods were called without a transaction already in effect. If a transaction is not already in effect when such a method is called, then a new transaction is started and retry of transactions will occur if the method is configured to retry transactions. If a transaction is already in effect when such a method is called, then the method will inherit the transaction of its caller, a new transaction will not be started, and retry of transactions will not occur even if retry of transactions is configured.

In some embodiments, a method should be safe for re-invocation after failure. For example, a retry of the failed transaction should yield results that are the same as they would have been had the previous attempt succeeded. More specifically:

If invoking the method initiates a chain of calls, then it should be safe to re-invoke the entire chain of calls.

All parameters of the method should be safe for reuse. When a transaction invoking the method is retried, it will be retried with the same method parameters that were used to invoke the failed attempt. Parameters that are primitives, immutable objects or that are references to read-only objects are inherently safe. If a parameter is a reference to an object that is to be modified, then it must be safe to re-invoke the method using the same reference, e.g., if the input parameter is a reference to a List object and that object is modified during the method call, then it should be the case that re-invoking the method using the same reference to the List will not unduly affect the result of the method call.

If the bean whose method is being retried is a stateful session bean, then the conversational state of the bean should be safe for a re-invoke. In particular, since the states of a stateful session bean are not transactional and are not restored on a transaction rollback, care should be taken to ensure that the states are valid after a rollback.

In some embodiments, the deployment descriptor may set properties of the container using an XML schema instance file, such as, the ejb-jar.xml and weblogic-ejb-jar.xsd. No changes are required to the standard ejb-jar.xml schema. A new element "retry-method-on-rollback" will be added to the weblogic-ejb-jar.xsd schema as shown by an exemplary syntax below:

```
<complexType name="weblogic-ejb-jarType">
  <sequence>
    ...
    <element name="retry-methods-on-rollback"
        type="wls:retry-methods-on-rollbackType" minOccurs="0"
        maxOccurs="unbounded"/>
</complexType>
```

This element describes a method or a set of methods that will be retried if a specified method starts a new transaction and if that transaction fails to successfully commit. An exemplary syntax of the "retry-method-on-rollback" element is shown as follows:

```
<complexType name="retry-methods-on-rollbackType">
  <sequence>
    <element name="description" type="wls:resource-descriptionType"
        minOccurs="0" maxOccurs="unbounded"/>
    <element name="retry-count"
        type="j2ee:xsdNonNegativeIntegerType"
        minOccurs="1" maxOccurs="1"/>
    <element name="method" type="j2ee:methodType" minOccurs="1"
        maxOccurs="unbounded"/>
  </sequence>
  <attribute name="id" type="ID"/>
</complexType>
```

The "retry-count" element specifies the maximum number of times to retry a method whose transaction has failed to commit. The automatic retry of container-managed transactions is enabled and disabled by specifying this per method property. Values of "n" greater than "0" will result in the retrying of a method up to "n" times and values of less or equal to "0" will result in no retrying of the method, effectively disabling the feature. Only methods having a container-managed transaction attribute of "Required" or "RequiresNew" are allowed to have a retry-count>0. If a method is assigned a non-zero retry-count value but it does not have a container-managed transaction attribute of either "Required" or "RequiresNew", then this should be considered an error by the EJB compiler.

In some embodiments, the feature of automatic retry of container-managed transactions can be enabled from the console at runtime after an application has been started. This allows system administrators to enable method retries on running applications, e.g., when it is noticed that an operation is encountering optimistic rollbacks fairly regularly. The administrator looks up the operation in the application reference manual and notes that the application designer has specified that the operation may be safely retried by a particular method. The administrator then uses the console to turn on the retries for that method.

In some embodiments, the retry count of a transaction can be modified at runtime via the console. There is an option "Set Retry Method On Rollback" for each bean deployed in the container. After selecting this option, a list of business methods that have transaction attribute "Required" or "RequiresNew" will appear. The user will be able to select a method from this list and view or modify the value of the retry-count attribute for that method. Modified values of the retry-count should be updated in the deployment descriptor of deployed bean, such as weblogic-ejb-jar.xml. For the consistency of the experience of the console users, the user interface supporting this feature may resemble the interface used for runtime modification of EJB per method security policies.

In some embodiments, a per bean method transaction rollback counter can be introduced into the console to keep track of the number of commit failures encountered for a given method. This may facilitate in diagnosing methods that use or that may be candidates for the feature of automatic retry of container-managed transactions.

In some embodiments, the feature of automatic retry of container-managed transactions may affect the performance of the business application involved. When the feature is not enabled or if it is enabled but the target method is not retried at runtime, there will be an almost negligible impact on performance due to the checking that is required to know that there is no need for a method retry. When the feature is used to retry a method, however, there may be a gain in performance when compared with having application code explicitly perform a method retry after catching a rollback exception. The improvement in performance is a result of the EJB container only having to setup and tear down the execution environment once for the initial method invoke and for all subsequent method re-invokes as opposed to application code effectively having to setup and tear down separately for each method invoke and re-invoke. If the method is invoked remotely, there will also be a performance gain to be had by not having to throw a remote exception from the server to the client and by not having the client re-invoke the method remotely.

The following exemplary scenarios illustrate the feature of automatic retry of container-managed transactions. Although they depict sets of codes for purposes of illustration, the EJB Finder is not limited to any particular code or arrangement of implementation. One skilled in the art will appreciate that the various composition of codes portrayed in the following could be omitted, rearranged, combined and/or adapted in various ways.

It is assumed the exemplary scenario contains an EJB container with instances of the following beans, all of which use container-managed transaction demarcation:
  Stateless Session bean:
    ProcureBean—place order for parts required for an assembly.
  Entity beans:
    PartBean—price and availability for a given part number and supplier.
    OrderBean—parts order.

The ProcureBean 301 can be specified by the deployment descriptor in XML file ejb-jar.xml, as shown by the exemplary source code in FIG. 3, where it is defined as Stateless 302, and uses container 303 managed transactions. The ProcureBean contains logic that manipulates PartBeans and OrderBeans, defined by a ProcureBean method "procure(int assemblycode, float maxTotalCost)" 304, which is a high-level method that is called to start a transaction and place an order for sets of parts that are required to build an assembly based on a complex calculation involving parts availability, pricing and compatibility of parts between vendors. The transaction attribute of the procure(..) method is defined as "RequiresNew" 305.

To increase overall system throughput, the system designers have decided that access to the parts data will use optimistic concurrency, which loads all relevant EJB instances, such as instances of PartBean, into the memory under the "optimistic" expectation that they are unlikely to be modified by another transaction in the duration of the current transaction. However, as parts prices as well as availability are subject to change at any time, it is possible that by the time the procure(..) method commits, the parts information in the instances of PartBean used to compute the order have become out-of-date, consequently, an optimistic concurrency exception is thrown and the order instances of OrderBean must be recomputed using updated parts data. The automatic transaction retry feature for procure(int, float) method 404 of the ProcureBean 403 can be enabled via elements in the "retry-method-on-rollback" element 401 in the weblogic-ejb-jar.xml deployment descriptor, as shown in FIG. 4. Since optimistic concurrency exceptions are to be expected from time to time, the application designer may decide to enable method retries on the procure(..) method by specifying the "retry-count" element 402 for the procure() method in weblogic-ejb-jar.xml to 2.

Figure 5:
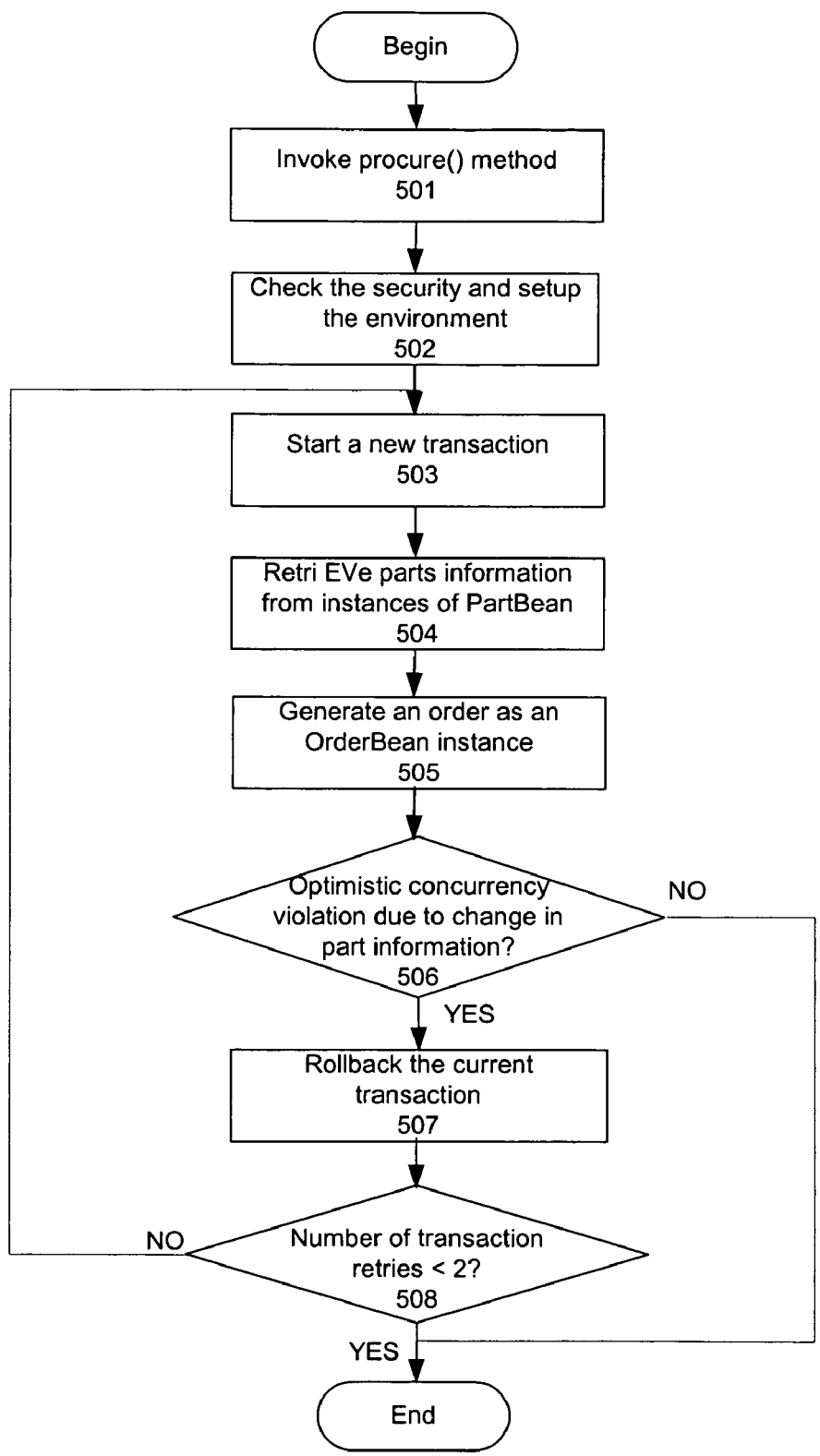
FIG. 5 is an exemplary flow chart illustrating the runtime behavior of a method that encounters a concurrency violation in accordance with one embodiment of the invention.

FIG. 5 is an exemplary flow chart illustrating the runtime behavior of a procure(..) method that encounters a concurrency violation in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 5, step 501 invokes procure(..), the security is checked and the environment is set up at step 502. A new transaction is started for procure(..) at step 503. Procure (..) determines what parts are required to produce the assembly and retrieves information about pricing, availability and vendor for each required part from a collection of PartBean instances using optimistic concurrency at step 504. It performs business logic such as configuring the optimum combination of parts and generating an order at step 505. It may happen that one of the parts has become unavailable from a chosen supplier since the original parts information was obtained and an optimistic concurrency violation is thrown at commit time at step 506. Once informed by the current transaction of the violation, the container rolls the transaction back at step 507 and determines if the procure(..) method has been retried less than 2 times at step 508. If so, a new transaction is started, which re-invokes the procure(..) method at step 503 with the same arguments that were used in the previous invocation. The procure(..) method will recalculate the combination of parts to order based on updated parts information, again at step 504-505.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks, including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "method" is used in the embodiments of the systems and methods described above, it will be evident that such concept can be interchangeably used with equivalent concepts such as, function, procedure, and other suitable concepts; while the concept "transaction" is used in the embodiments of the systems and methods described above, it will be evident that such concept can be interchangeably used with equivalent concepts such as, session, conversation and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide automatic retry of transactions, comprising:

one or more processors;

an application component deployed in a container, wherein the application component includes a plurality of methods, wherein each said method is associated with separate one or more retry criteria, and wherein, at least, a first one or more retry criteria associated with a first said method is different from a second one or more retry criteria associated with a second said method;

wherein the container performs the steps of:

starting a first transaction to perform one or more operations for the application component, when the first said method is invoked;

rolling back the first transaction when the first transaction fails;

restarting a new first transaction automatically and retrying the first said method for a first number of times, until the first one or more retry criteria associated with the first method are met, starting a second transaction to perform one or more operations for the application component, when the second said method is invoked;

rolling back the second transaction when the second transaction fails; and restarting a new second transaction automatically and retrying the second said method for a second number of times, until the second one or more retry criteria associated with the second method are met.

2. The system according to claim 1, wherein:
the application component can be an instance of a class, which can be one of a software object, an interface, and a module.

3. The system according to claim 1, wherein:
the transaction is container-managed.

4. The system according to claim 1, wherein:
at least one said method provides an operation that can be one of:
   exchanging one or more data entities with a database; and
   performing business logic on the one or more data entities.

5. The system according to claim 1, wherein:
the transaction may throw an exception when it fails, such exception can be one of:
   an optimistic concurrency exception; and
   a database deadlock exception.

6. The system according to claim 1, wherein:
the application component is further capable of performing at least one of the following only before a transaction of the method is first started:
   setting up the environment for the transaction; and
   checking the security of the transaction.

7. The system according to claim 1, wherein:
a criterion of the one or more retry criteria can be one of:
   an attribute to enable or disable the retry of a transaction; and
   the maximum number of times a transaction of the method can be retried.

8. The system according to claim 7, wherein:
a criterion in the one or more retry criteria can be one of:
   the retry of a transaction of the method is enabled; and
   the number of times a transaction of the method has been retried is no more than the maximum number of retries permitted.

9. The system according to claim 1, wherein:
the retry setting component can include at least one of:
   a deployment descriptor capable of setting one or more retry properties of the method in XML format at deployment time; and
   a console capable of setting and/or updating the one or more retry properties of the method at runtime while the method is in use.

10. The system according to claim 1, wherein:
the container begins a new transaction each time when a particular said method is invoked.

11. The system according to claim 1, wherein:
the first number of times is different from the second number of times.

12. The system according to claim 1, further comprising:
a retry setting component capable of at least one of setting and modifying the separate one or more retry criteria associated with each said method.

13. A method to provide automatic retry of transactions, comprising:
deploying an application component in a container, wherein the application component includes a plurality of methods, wherein each said method is associated with separate one or more retry criteria, and wherein, at least, a first one or more retry criteria associated with a first said method is different from a second one or more retry criteria associated with a second said method;

performing at least one of setting and modifying the separate one or more retry criteria;

invoking the first said method, which causes the container to start a first transaction to perform one or more operations;

rolling back the first transaction when the first transaction fails;

restarting a new first transaction automatically and retrying the first said method for a first number of times, until the first one or more retry criteria associated with the first said method are met;

invoking the second said method, which causes the container to start a second transaction to perform one or more operations;

rolling back the second transaction when the second transaction fails; and restarting a new second transaction automatically and retrying the second said method for a second number of times, until the second one or more retry criteria associated with the second said method are met.

14. The method according to claim 13, wherein:
an operation in the one or more operations can be one of:
   exchanging one or more data entities with a database; and
   performing business logic on the one or more data entities.

15. The method according to claim 13, further comprising:
performing at least one of the following only before a transaction of the method is first started:
   setting up the environment for the transaction; and
   checking the security of the transaction.

16. The method according to claim 13, further comprising:
throwing an exception when a transaction fails, such exception can be one of:
   an optimistic concurrency exception; and
   a database deadlock exception.

17. The method according to claim 13, wherein:
a criterion in the one or more retry criteria can be one of:
   an attribute to enable or disable the retry of a transaction; and
   the maximum number of times a transaction of the method can be retried.

18. The method according to claim 13, further comprising:
setting and/or updating the one or more retry criteria of at least one said method via at least one of:
   a deployment descriptor capable of setting the one or more retry properties in XML format at deployment time; and
   a console capable of setting and/or updating the one or more retry properties at runtime while the method is in use.

19. A machine readable medium having instructions stored thereon that when executed cause a system to:
deploy an application component in a container, wherein the application component includes a plurality of methods, wherein each said method is associated with separate one or more retry criteria, and wherein, at least, a first one or more retry criteria associated with a first said method is different from a second one or more retry criteria associated with a second said method;

perform at least one of set and modify the separate one or more retry criteria;

invoke the first said method, which causes the container to start a first transaction to perform one or more operations;

roll back the first transaction when the first transaction fails;

restart a new first transaction automatically and retry the first said method for a first number of times, until the first one or more retry criteria associated with the first said method are met;

invoke the second said method, which causes the container to start a second transaction to perform one or more operations;

roll back the second transaction when the second transaction fails; and restart a new second transaction automatically and retrying the second said method for a second number of times, until the second one or more retry criteria associated with the second said method are met.

20. The machine readable medium of claim 19, wherein:

at least one said method provides an operation that can be one of:

exchanging one or more data entities with a database; and performing business logic on the one or more data entities.

21. The machine readable medium of claim 19, further comprising instructions that when executed cause the system to:

perform at least one of the following only before a transaction of the method is first started:

setting up the environment for the transaction; and checking the security of the transaction.

22. The machine readable medium of claim 19, further comprising instructions that when executed cause the system to:

throw an exception when a transaction fails, such exception can be one of:

an optimistic concurrency exception; and a database deadlock exception.

23. The machine readable medium of claim 19, wherein:

a criterion of the one or more retry criteria can be one of:

an attribute to enable or disable the retry of a transaction; and the maximum number of times a transaction of the method can be retried.

24. The machine readable medium of claim 19, further comprising instructions that when executed cause the system to:

set and/or update one or more retry properties of the method via at least one of:

a deployment descriptor capable of setting the one or more retry properties in XML format at deployment time; and a console capable of setting and/or updating the one or more retry properties at runtime while the method is in use.

25. A system to provide automatic retry of transactions, comprising:

one or more processors;

means for deploying an application component in a container, wherein the application component includes a plurality of methods, wherein each said method is associated with separate one or more retry criteria, and wherein, at least, a first one or more retry criteria associated with a first said method is different from a second one or more retry criteria associated with a second said method;

means for performing at least one of setting and modifying the separate one or more retry criteria;

means for invoking the first said method, which causes the container to start a first transaction to perform one or more operations;

means for rolling back the first transaction when the first transaction fails;

means for restarting a new first transaction automatically and retrying the first said method for a first number of times, until the first one or more retry criteria associated with the first said method are met;

means for invoking the second said method, which causes the container to start a second transaction to perform one or more operations;

means for rolling back the second transaction when the second transaction fails; and means for restarting a new second transaction automatically and retrying the second said method for a second number of times, until the second one or more retry criteria associated with the second said method are met, wherein the first number of times is different from the second number of times.

* * * * *

UNITED STATES PATENT AND TRADEMARK OFFICE
CERTIFICATE OF CORRECTION

PATENT NO. : 7,774,780 B2
APPLICATION NO. : 10/967001
DATED : August 10, 2010
INVENTOR(S) : Thorick Chow et al.

It is certified that error appears in the above-identified patent and that said Letters Patent is hereby corrected as shown below:

Title page, Item (56), in column 2, under "Other Publications", line 3, delete "Institure" and insert -- Institute --, therefor.

On sheet 5 of 5, in Figure 5, Box No. 504, line 1, delete "Retri EVe" and insert -- Retrieve --, therefor.

In column 3, line 22, after "that" delete "that".

In column 7, line 1, delete "assemblycode," and insert -- assemblyCode, --, therefor.

In column 8, line 67, in claim 1, delete "met," and insert -- met --, therefor.

Signed and Sealed this
Tenth Day of May, 2011

David J. Kappos
*Director of the United States Patent and Trademark Office*